United States Patent [19]
Du Vall

[11] 3,775,655
[45] Nov. 27, 1973

[54] METHOD AND APPARATUS FOR TRANSDUCER TEMPERATURE COMPENSATION

[75] Inventor: Wilbur E. Du Vall, Redondo Beach, Calif.

[73] Assignee: Xerox Corporation, Rochester, N.Y.

[22] Filed: Sept. 15, 1972

[21] Appl. No.: 289,447

[52] U.S. Cl. .................... 318/634, 33/125, 77/5
[51] Int. Cl. .............................. G05d 23/275
[58] Field of Search ............... 318/634; 33/125; 77/5

[56] References Cited
UNITED STATES PATENTS

| | | | |
|---|---|---|---|
| 3,142,120 | 7/1964 | Mottu | 33/125 |
| 3,236,124 | 2/1966 | Rhoades | 77/5 |
| 3,332,153 | 7/1967 | Loewen | 33/125 |
| 3,579,073 | 5/1971 | Johnstone | 318/634 |
| 2,844,775 | 7/1958 | Miller et al. | 318/634 |
| 3,527,991 | 9/1970 | Sackin | 318/634 |
| 3,646,839 | 3/1972 | Shillam | 318/634 X |

Primary Examiner—B. Dobeck
Attorney—James J. Ralabate et al.

[57] ABSTRACT

Method and apparatus for compensating a position servomechanism for errors introduced by differences in coefficients of thermal expansion between a transducer element and a positioned element. A position displacement signal based on distance from a center position on the transducer element and a temperature variation signal based on the difference between the ambient temperature and a reference temperature are multiplied together with appropriate constants to generate an error signal which is applied to the servomechanism to correct the final position.

13 Claims, 5 Drawing Figures

3,775,655

METHOD AND APPARATUS FOR TRANSDUCER TEMPERATURE COMPENSATION

BACKGROUND OF THE INVENTION

The present invention relates generally to temperature compensating systems and, more particularly, to systems for correcting position servomechanisms for ambient temperature fluctuations.

In the field of magnetic disc memory systems, precision position servomechanism are commonly employed to position a magnetic head over a particular track on the disc. In such systems, relatively high resolution position transducers are needed and a commonly used transducer incorporates a pair of optical gratings, one fixed and one moveable with the carriage for the magnetic heads. A beam of light is passed through the gratings to a photocell. Relative movement of the gratings produces recurrent light fluctuations which are detected by the photocell and counted as an indication of the position of the moveable grating and carriage. Typically, the positioning of a head over a particular track is referenced to a particular count associated with a particular physical position along the moveable optical grating.

The optical gratings used with such transducers are normally constructed of glass or the like which has a different coefficient of thermal expansion than the metal used in the carriage. Temperature variations then cause the head to be positioned in a different place than that indicatd by the position transducer. Thus, if the ambient temperature around the position transducer is other than a particular reference temperature, the position of the head must be adjusted to ensure proper alignment of the head with the desired track. Heretofore, the problem was either avoided by maintaining the ambient temperature as close as possible to the reference temperature, or complicated thermomechanical devices were employed in an attempt to adjust the position of the heads as the ambient temperature varied. However, as the spacing between tracks decreases, the accuracy of these prior techniques becomes inadequate for practical use.

Thus, there has long been a need for a reliable and accurate temperature compensating technique which insures the proper positioning of an element, such as a magnetic head, despite variations in the ambient temperature. The present invention satisfies that need.

SUMMARY OF THE INVENTION

The present invention provides a method and apparatus for temperature compensation of positioning system so that an element, such as a magnetic head, may be reliably and accurately positioned despite variations in the ambient operating temperature and differences between the coefficients of thermal expansion of the positioned element and the position transducer elements.

In the system of the invention, the position error is a function of position along a moveable transducer element and the ambient temperature. Therefore, a position transducer signal is combined with a temperature signal to generate an error signal which is then applied to the positioning system to cause a corrective movement of the positioned element. In the presently preferred embodiment of the invention, the error signal is selectively applied to the positioning system only when the positioned element is at rest at an apparent commanded position. The error signal is then applied to the positioning system to cause the positioned element to be moved to the corrected position. Thus, the temperature compensating system does not interfere with the conventional operation of the positioning system. When a new commanded position is desired, the error signal is disconnected from the positioning system while the positioned element is moved to its new position.

In the position transducer used in the presently preferred embodiment of the invention, an optical grating is mounted on the carriage and moves with it past a fixed optical grating and associated light source and photocell. The moveable optical grating is mounted substantially at the center of its length leaving the ends free. The center mounting point is then temperature invariant with respect to the carriage and heads while the ends may expand or contract with variations in the ambient temperature.

There is an exact correspondence between the position signal produced by the position transducer and the actual head position for only one reference temperature. For other ambient temperatures, the position error is dependent on the distance, plus or minus, along the moveable grating from the center mounting point (position displacement) and the difference, plus or minus, between the ambient temperature and the reference temperature (temperature variation).

In the system of the invention, an error signal is generated which is proportional to the product of the position displacement and the temperature variation. The multiplication is accomplished by suitable electronic circuitry and the error signal is applied to the input of a position servomechanism resulting in a corrective movement of the carriage and heads.

Thus, the present invention provides a temperature compensating system for use with a positioning system having positioned elements and position transducer elements with different coefficients of thermal expansion. The generated error signal is highly accurate in that it is dependent on both position on the transducer itself and temperature variation. Other features and advantages of the present invention will become apparent from the following detailed description of the presently preferred embodiment.

DESCRIPTION OF THE PREFERRED EMBODIMENT

Figure 1:
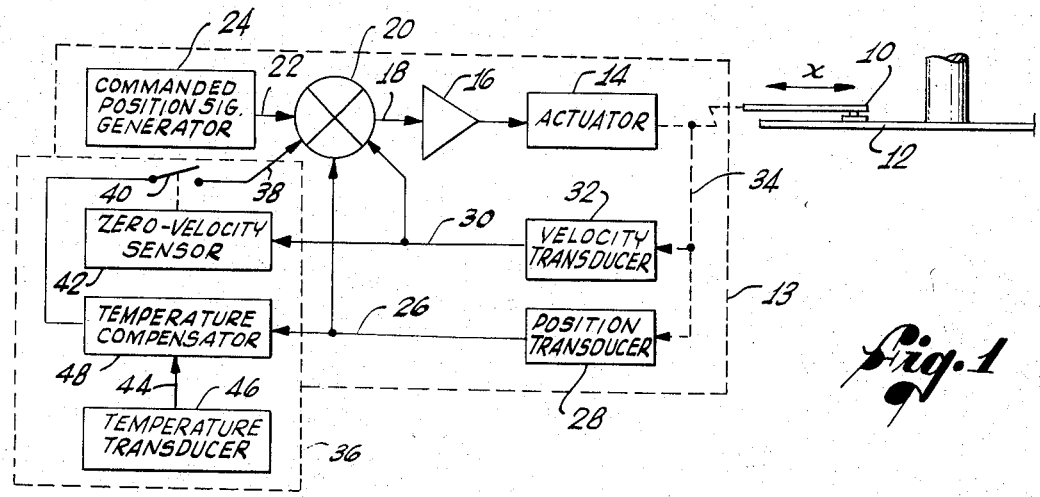
FIG. 1 is a block diagram of a position servomechanism incorporating the temperature compensating system of the present invention.

Turning now to the drawings, and particularly FIG. 1 thereof, the temperature compensating system of the present invention is utilized in a magnetic disc memory system in which a magnetic head 10 is positioned on the surface of a magnetic disc 12 by means of a position servomechanism 13, including an electromechanical actuator 14. The actuator 14 is of conventional design and is driven by an amplifier 16 which receives a control signal on a line 18 which is the result of a number of signals appearing at a summing junction 20. Typically, the control signal applied to amplifier 16 is basically the difference between the signal on line 22 from a commanded position signal generator 24 and a present position signal on a line 26 from a position transducer 28. Typically, in such a position servomechanism 13, an additional velocity signal on a line 30 from a velocity transducer 32 is included in the control signal to improve stability. The position transducer 28 and velocity transducer 32 are mechanically connected, as illustrated by dotted line 34, to the positioned element, or carriage, on which the head 10 is mounted.

Conventionally, when the head 10 is in its proper or commanded position, the sum of the signals in the summing junction 20 results in a zero control signal as input to amplifier 16. It should be appreciated that the position servomechanism 13 forms no part of the present invention and the design and construction of such systems is well known to those skilled in the art.

The temperature compensating system 36 of the present invention provides an additional input on a line 38 to the summing junction 20. The error signal on line 38 is selectively applied to the summing junction 20 by means of a switch 40 when the head 10 is at rest on an apparently correct position. The position servomechanism 13 then functions normally when moving between commanded positions. Any conventional means such as a zero velocity sensor 42 determines when the head 10 is at rest and controls the operation of the switch 40. The switch 40 and zero velocity sensor 42 are of conventional design and may be implemented by techniques well known to those skilled in the art.

The error signal on line 38 is a function of the indicated present position signal on line 26 from the position transducer 28 and the ambient temperature indicated by a temperature signal on line 44 from a temperature transducer 46 preferably in the vicinity of the position transducer 28 to follow changes in ambient temperatures near the transducer. The position signal on line 26 and temperature signal on line 44 are combined in a temperature compensator 48 which generates the error signal on line 38 which is applied to the summing junction 20 to reposition the head 10 on the magnetic disc 12.

Figure 3:
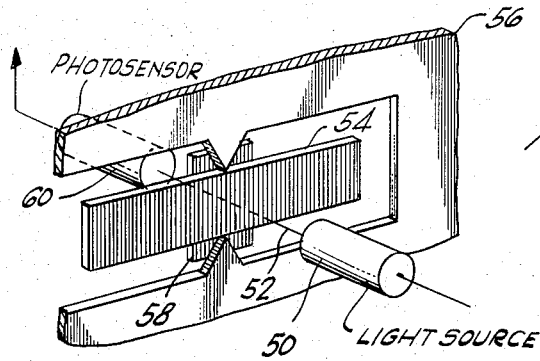
FIG. 3 is a diagrammatic perspective view of an optical grating position transducer.

While the temperature compensating system of the present invention may be utilized with any type of position transducer 28, the presently preferred embodiment of the invention was designed for use with an optical grating position transducer such as that illustrated in FIG. 3. Typically, such a position transducer includes a light source 50 which directs a beam 52 of light through a moveable optical grating 54 which is physically attached to a carriage 56 on which the head 10 (FIG. 1) is mounted. The beam 52 passes through the moveable optical grating 54 and then through a stationary optical grating 58 and a photosensor 60. Movement of the optical grating 54 past the stationary optical grating 58 causes fluctuations in the beam 52 of light reaching the photosensor 60 which are conventionally electronically processed to provide an indication in the position of the carriage 56 and head 10.

Figure 4:
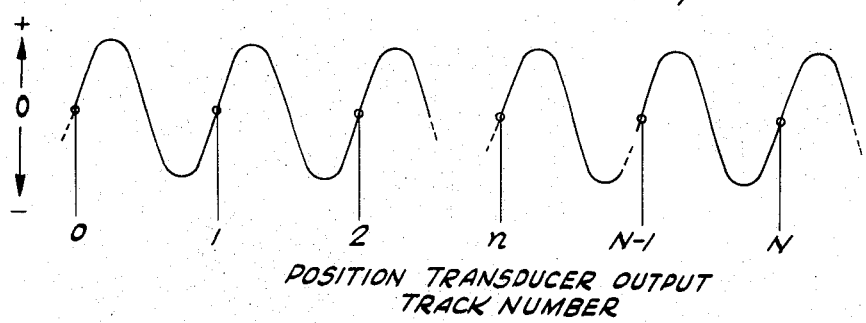
FIG. 4 is a graph of a waveform of the output signal from the photosensor used with the optical grating position transducer.

In the particular optical grating position transducer used in the presently preferred embodiment of the invention, the output of the photosensor 60 is substantially a sine wave such as that illustrated in FIG. 4. The spacing between the lines on the moveable and stationary optical gratings 54 and 58, respectively, is such that a complete cycle is generated for each track on the magnetic disc 12. The sensing circuitry is such that proper position of the head 10 on a track is indicated as the waveform passes through a zero reference voltage on the positive going portion of the wave. The number of zero crossings is conventionally counted during movement of the carriage 56 to indicate with which track the head is aligned.

The servomechanism 13 is designed so that the head 10 is stopped when the output of the photosensor 60 is at the commanded track ($n$) of N possible tracks with the final exact position being determined by the output of the photosensor being at the zero reference voltage on the positive going side of the waveform. Again, the implementation of a servomechanism 13 for effecting this operation forms no part of the present invention and the design of such systems is well known to those skilled in the art.

The servomechanism 13 moves the carriage 56, the head 10 and the moveable optical grating 54 to a position which results in a zero crossing output of the photosensor 60 for a particular desired track number. However, because of different coefficients of thermal expansion of the grating 54, and carriage 56, the correspondence between the head 10 position and grating 54 position will be correct for only one particular reference temperature. As the ambient temperature varies from the reference temperature, the moveable optical grating 54 expands or contracts more or less than the carriage 56 and head 10 depending upon their respective thermal coefficients of expansion. Thus, when the servomechanism 13 is at rest and the output of the photosensor 60 is at zero, the actual position of the head 10 may not be correct.

Figure 5:
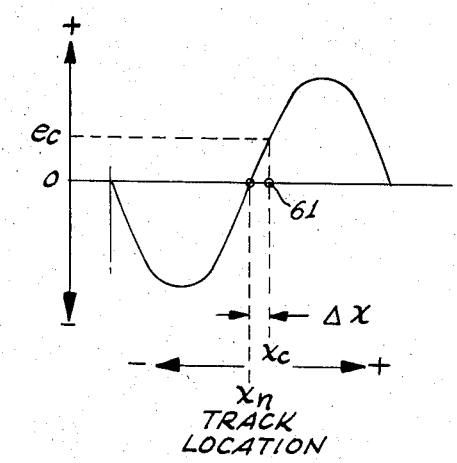
FIG. 5 is a graph of a detail of the waveform of FIG. 4 illustrating the effect of the addition of the error signal.

The temperature compensating system 36 of the present invention generates an error signal $e_c$ which, as illustrated in FIG. 5, has the effect of adding or subtracting a fixed voltage to the position transducer waveform. The position servomechanism 13 then seeks a combined error signal $e_c$ and photosensor 60 output which results in a new effective zero crossing at 61. This in turn causes corrective movement of the moveable optical grating 54 and the head 10 by a small distance $\Delta x$ to the correct track location.

It should be noted that the addition of the error signal $e_c$ essentially follows the non-linear sine curve but that the error signals $e_c$ are generally small and the corrections normally take place over the substantially linear region of the curve around the zero crossing point. If larger corrections are contemplated in which the effect of the non-linearity would be significant, an optical grating system which produces a more triangular waveform may be employed.

Figure 2:
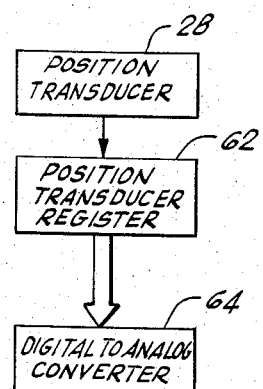
FIG. 2 is a combined block diagram and electrical schematic diagram of a presently preferred embodiment of a circuit for generating the error signal.
Figure 2:
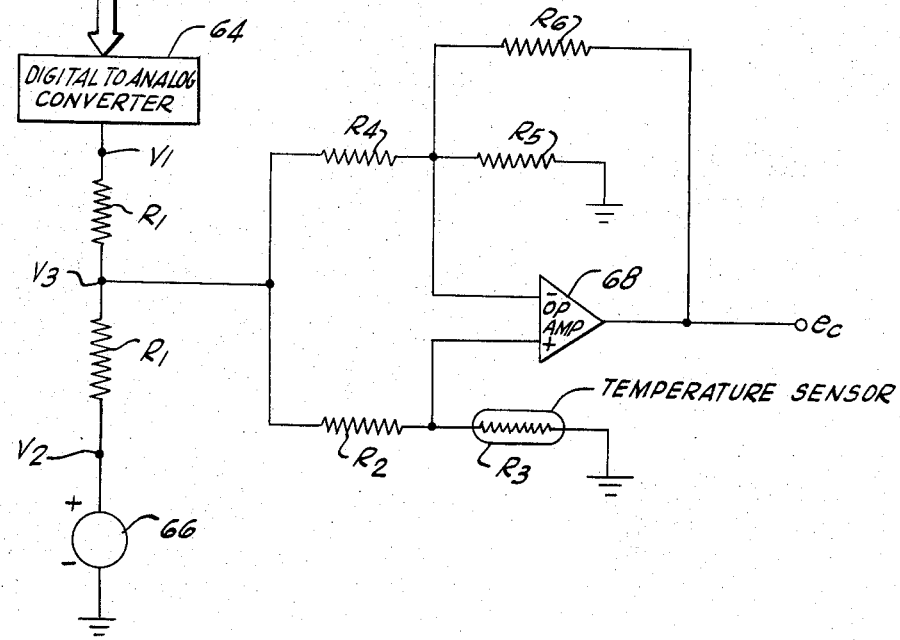

The correction signal $e_c$ may be generated by any conventional circuitry well known to those skilled in the art. An example of such circuitry is illustrated in FIG. 2. As discussed above, the position transducer 28 essentially produces a sine wave in which positive going zero crossings are indicative of a track position the number of such zero crossings being counted to indicate the track number. Thus, in FIG. 2 the counted zero crossings from the position transducer 28 are stored in a position transducer register 62. The stored number in register 62 indicates position as a track number ($n$) over which the head 10 is apparently positioned. The digital position signal in register 62 is applied to a digital-to-analog converter 64 to generate an analog position signal voltage $V_1$ which generally, is of the form: $V_1 = -K_1 n$ where $K_1$ is a suitable constant for the particular circuitry.

As discussed above, the correction signal is dependent upon the distance from the center point of the moveable optical grating 54 and a reference voltage $V_2$ is provided by a voltage source 66 which has a potential equal to the output of the digital-to-analog converter 64 when the optical grating 54 is at its center point. $V_2$ has the form $V_2 = K_1 N/2$ where N is the total number of tracks on the disc 12. The position signal voltage $V_1$ and reference voltage $V_2$ are connected through resistors R1, to a summing point providing a voltage $V_3$ indicative of the distance, positive or negative of the moveable optical grating 54 from its center point or position displacement. $V_3$ has the form $V_3 = K_2(N-n)$ where $K_2$ again is a suitable constant.

The signal voltage $V_3$ is connected through resistors R2 and R4 to the positive and negative inputs, respectively, of an operational amplifier 68. A temperature sensitive resistor R3 is also connected between the positive input to the operational amplifier 68 and a reference ground. The configuration of resistor R3 is such that resistance changes are proportional to the difference between a reference temperature ($T_r$) and the ambient temperature (T) or $\Delta R3 = k_0 R_0 (T_r - T)$ where $k_0$ is a combined coefficient of thermal expansion for the complete system and $R_0$ is the reference resistance for R3.

The negative input of operational amplifier 68 is also connected to ground through a resistor R5. The output of the operational amplifier is the correction signal $e_c$ and feedback from the output of the amplifier to the negative input is provided by a resistor R6. The resistance networks at the inputs to the operational amplifier are such that when the temperature sensitive resistor R3 is at a reference temperature ($T_r$), the error voltage $e_c$ is zero. Variations in the ambient temperature then cause the error signal $e_c$ to be positive or negative depending on the direction of temperature change.

Generally, the error voltage $e_c$ has the form $$e_c = K_T(N-n)(T_r - t)$$

where $K_t$ is the total system constant which can be shown to be $$K_T = k_0 R_0 K_1 [R6(R4+R5) + R4R5]/2(R2R4R5)$$

It should be appreciated that the circuit shown in FIG. 2 is only one example and that many circuit variations are possible for any particular positioning system. Thus the only requirement for the error signal $e_c$ is that it be proportional to both position displacement and temperature variation and suitable constants are added depending on the particular system. While a particular technique for utilizing the error signal has been described, it should be appreciated that many modifications are possible in order to utilize the temperature compensating technique of the invention in a different positioning system. Thus, the scope of the temperature compensating system of the invention is not intended to be limited except by the following claims.

I claim:

1. A temperature compensating system for use in a positioning system having a position transducer element moveable with a positioned element, said transducer element having a different coefficient of thermal expansion than said positioned element, said temperature compensating system comprising:
   means for sensing the position of said transducer element and generating a position signal;
   means for sensing the ambient temperature around said transducer element and said positioned element and generating a temperature signal;
   means for combining said position signal and said temperature signal to generate an error signal dependent upon the difference in expansion of said position transducer element and said positioned element due to variation of said ambient temperature; and
   means for applying said error signal to said positioning system.

2. A temperature compensating system as defined in claim 1 wherein:
   said combining means multiplies said position signal by said temperature signal and appropriate constants to generate said error signal which is dependent upon the position of said transducer element and said ambient temperature.

3. A temperature compensating system as defined in claim 1 wherein said means for sensing ambient temperature includes:
   means for comparing said ambient temperature with a reference temperature to generate a temperature variation signal indicative of their difference.

4. A temperature compensating system as defined in claim 1 wherein:
   said means for position sensing includes means for comparing the sensed position with a midpoint along the length of said transducer element to generate a position displacement signal indicative of the distance and direction from that midpoint;
   said means for sensing ambient temperature includes means for comparing said ambient temperature with a reference temperature to generate a temperature variation signal indicative of the difference between said ambient temperature and said reference temperature; and
   said combining means multiplies said position signal by said temperature signal and appropriate constants to generate said error signal.

5. For use in a position servo-mechanism having a positioned element, a temperature compensating system comprising:
   an optical grating position transducer having an element moveable with said positioned element, the physical position of said moveable transducer element being indicative of the physical position of said positioned element, said moveable transducer element having a different coefficient of thermal expansion than said positioned element;
   means for sensing the position of said moveable transducer element and generating a position signal;
   means for comparing the ambient temperature around said transducer element and said positioned element with a reference temperature to generate a temperature variation signal indicative of the difference between said ambient temperature and said reference temperature;

means for multiplying said position signal by said temperature variation signal and appropriate constants to generate an error signal; and means for applying said error signal to said position servomechanism to cause corrective movement of said positioned element.

6. For use in a position servomechanism having a positioned element, a temperature compensating system comprising:

an optical grating position transducer having an element moveable with said positioned element, said moveable transducer element being mounted at a midpoint along its length, the physical position of said moveable transducer element being indicative of the physical position of said positioned element, said moveable transducer element having a different coefficient of thermal expansion than said positioned element;

means for sensing the position of said moveable transducer element and generating a position signal, said means for sensing compares the sensed position with said midpoint to generate a position displacement signal indicative of the distance and direction from that midpoint;

means for comparing ambient temperature with a reference temperature to generate a temperature variation signal indicative of the difference between said ambient temperature and said reference temperature;

means for multiplying said position displacement signal by said temperature variation signal to generate an error signal; and means for applying said error signal to said position servomechanism to cause corrective movement of said positioned element.

7. A temperature compensating system as defined in claim 6 wherein:

said means for applying selectively applies said error signal to said position servomechanism when said positioned element is at rest on an apparent commanded position.

8. A temperature compensating system as defined in claim 5 wherein:

said means for applying selectively applies said error signal to said position servomechanism when said positioned element is at rest on an apparent commanded position.

9. A method of temperature compensating a positioning system which has a position transducer element moveable with a positioned element with the transducer element having a different coefficient of thermal expansion than said positioned element, said method of temperature compensating comprising the steps of:

sensing the position of said transducer element and generating a position signal in response thereto;

sensing the ambient temperature around said position transducer element and said positioned element, and generating a temperature signal in response thereto;

combining said position signal and said temperature signal to generate an error signal dependent upon the difference in expansion of said position transducer element and said positioned element due to variation in said ambient temperature; and applying said error signal to said positioning system.

10. The method defined in claim 9 wherein:

said combining step includes multiplying said position signal by said temperature signal and appropriate constants in order to generate a said error signal; and said temperature sensing step includes comparing said ambient temperature with a reference temperature to generate a temperature variation signal indicative of the difference between said ambient temperature and said reference temperature.

11. The method defined in claim 9 wherein:

said applying step includes selectively applying said error signal to said positioning system when said positioned element is at rest on an apparent commanded position.

12. A temperature compensating system for use in a position servomechanism for positioning a magnetic head over a desired track, the magnetic head and associated carriage moveable with the moveable element of an optical grating position transducer, said moveable transducer element having a different coefficient of thermal expansion than said magnetic head and associated carriage, said temperature compensating system comprising:

means for mounting said moveable transducer element on said carriage at a midpoint along the length of said element, the ends of said element being free for thermal expansion and contraction;

means for comparing the sensed position of said moveable transducer element with said midpoint and generating a position displacement signal indicative of the distance and direction of movement from that midpoint;

means for comparing ambient temperature with a reference temperature to generate a temperature variation signal indicative of the difference between said ambient temperature and said reference temperature;

means for multiplying said position displacement signal by said temperature variation signal and appropriate constants to generate an error signal; and means for selectively applying said error signal to said position servomechanism when said carriage and magnetic head are at rest at an apparent commanded position to cause corrective movement of said head.

13. A method of temperature compensating a positioning system which has a position transducer element moveable with a positioned element with said transducer element having a different coefficient of thermal expansion than said positioned element, said method of temperature compensating comprising the steps of:

mounting a moveable element of an optical grating position transducer for movement with said positioned element, said moveable transducer element being mounted at a midpoint along its length;

sensing the position of said transducer element and comparing the sensed position of said moveable element with said midpoint to generate a position displacement signal indicative of the distance and direction from said midpoint;

sensing the ambient temperature and generating a temperature signal in response thereto;

combining said position signal and said temperature signal to generate an error signal; and selectively applying said error signal to said positioning system when said positioned element is at rest on an apparent commanded position to compensate for variations in ambient temperature.

* * * * *

PO-1050
(5/69)

UNITED STATES PATENT OFFICE
CERTIFICATE OF CORRECTION

Patent No. 3,775,655      Dated November 27, 1973

Inventor(s) Wilbur E. Du Vall

It is certified that error appears in the above-identified patent and that said Letters Patent are hereby corrected as shown below:

Column 3, line 62, delete "and" and insert therefor --to--.

Column 5, line 50, delete "t" and insert therefor --T--; line 51 delete "$K_t$" and insert therefor --$K_T$--.

Signed and sealed this 23rd day of April 1974.

(SEAL)
Attest:

EDWARD M. FLETCHER, JR.
Attesting Officer

C. MARSHALL DANN
Commissioner of Patents